July 30, 1929.   G. R. BOTT ET AL   1,722,488
BALL BEARING
Filed Nov. 5, 1923   2 Sheets-Sheet 1

INVENTORS
George R. Bott
Frederick E. Mueller
BY
C. P. Goepel
their ATTORNEY

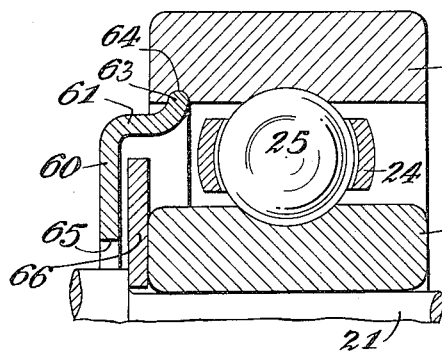
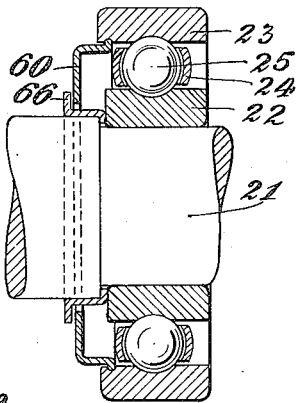
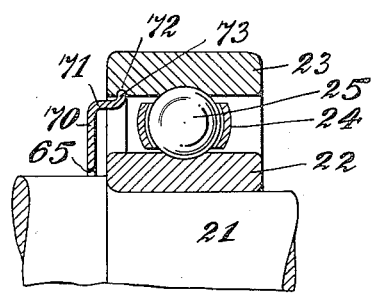
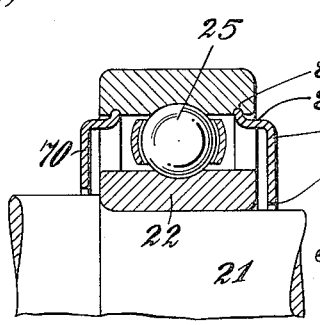
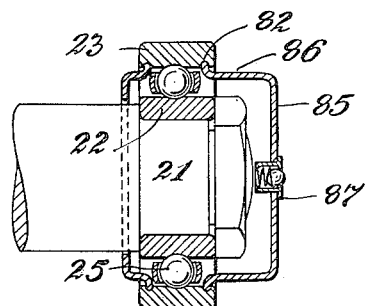
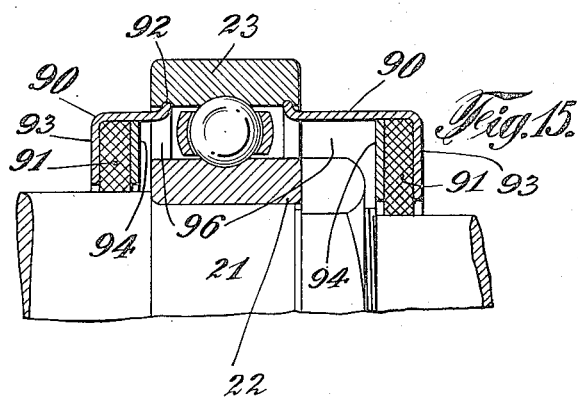
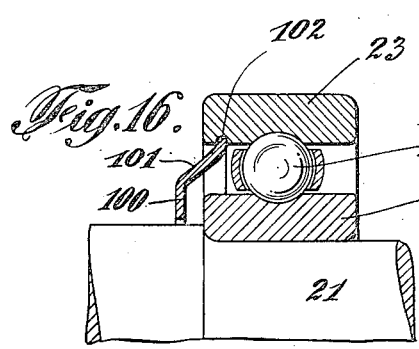
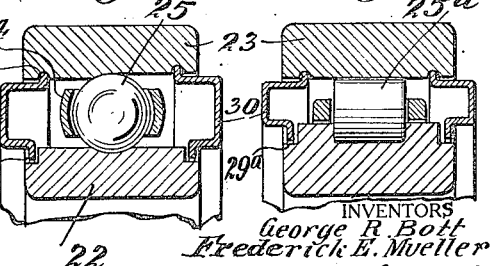

Patented July 30, 1929.

1,722,488

UNITED STATES PATENT OFFICE.

GEORGE R. BOTT AND FREDERICK E. MUELLER, OF MOUNT VERNON, NEW YORK, ASSIGNORS TO NORMA-HOFFMANN BEARINGS CORPORATION, OF LONG ISLAND CITY, NEW YORK, A CORPORATION OF NEW YORK.

BALL BEARING.

Application filed November 5, 1923. Serial No. 672,728.

This invention relates to ball bearings, and has for its particular object to provide a lubricant packed ball bearing. In accordance with the invention, it is proposed to commercially pack the bearings with a lubricant at the place of manufacture making them ready for use. The balls and cages under such conditions would be packed in a suitable grease. Heretofore, in the manufacture of ball bearings, such bearings were made up of an inner ring, an outer ring and a cage with balls. After such bearings were delivered to the purchaser, they were installed in suitable housings depending upon their particular uses, and separate means were provided to take care of the lubrication. Thus the lubrication was a secondary problem, depending upon the design of the housing which was arranged to take care of the lubricant and to exclude such foreign materials as dirt, grit, dust, etc., which ingress would effect the efficient operation of the bearings and ultimately bring them through a stage of wear to final destruction.

To overcome these disadvantages it is proposed to attach closing means directly to one of the races, either the inner or outer, and to be in close proximity to the other race, but not in contact therewith, nor in contact with the cage or balls. Preferably the lubricator barrier is attached to the outer race. The barrier is provided with a pocket portion to hold the lubricant supply. The bearings with the lubricator barrier can be used either in horizontal or vertical position. In each case the centrifugal action of the grease or lubricant would be outwards radially during the operation of the bearing. The splash of the lubricant between the balls and the raceways would be sideways but not axially. The lubricator barrier is snapped into a groove form of the races, so as to make a practically leak-proof joint, and the forces acting upon the lubricant during the movement of the bearings, will be guided by the barrier and constrained therein. Thereby the lubricant will be confined against loss and serve in a clear way the purpose for which it was applied. At the same time the barrier will prevent dirt or grit from entering the bearings. While one end is provided to form a leak-tight joint, the other end of the barrier is in close proximity to the other race ring, but does not touch it.

The invention comprises the building into the bearing the fundamental structure required for its proper operation as a lubricant confiner, and a barrier to the exit of lubricant acting at the same time as a barrier to the ingress of dirt or grit.

The invention will be more fully described hereinafter and shown in the accompanying drawings and finally pointed out in the subjoined claims.

In the accompanying drawings wherein similar reference characters designate corresponding parts throughout the several views:

Figure 6 is a side view of a part of the structure shown in Figure 5;

Figure 10 is a section of a modified form of our invention;

Figure 11 is a section of still a different form;

Figure 12 shows another and simple form of our invention;

Figure 13 is a similar section showing the invention applied to both sides of the bearing;

Figure 14 is a central section again showing the invention applied to both sides of the bearing;

Figure 15 is a section showing the invention applied to both sides of a bearing and also provided with lubricating means;

Figure 16 is a section showing the invention applied to one side of the bearing;

Figure 17 shows an open type of bearing provided with our invention; and

Figure 18 shows a roller bearing provided with our invention.

Figure 1:
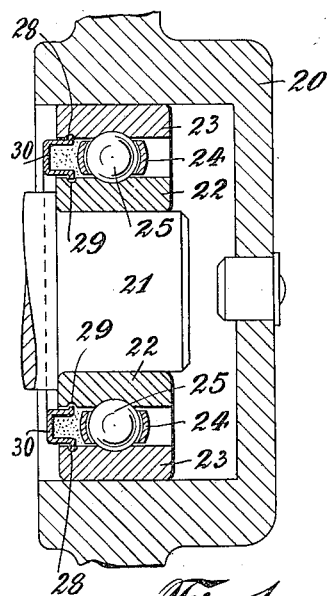
Figure 1 shows a central section of a housing having a bearing therein provided with our invention.

Referring to the drawings and more particularly to Figure 1, the housing 20 of any suitable construction is therein shown and within the housing 20 the shaft 21 projects, this shaft 21 being provided with the usual inner race ring 22, the outer race ring 23, the cage 24 holding the bearing balls 25. A closed type of bearing is shown in Figure 1 and in the other views, but it is clear that the invention may also be applied to the open type or type known by the trade name "Norma", and the invention may also be applied to the well known cup and cone bearing.

The outer ring 23 of the structure shown in Fig. 1 is provided with a circumferential groove 28 and within this groove 28 there is snapped one leg of a spring sheet metal member 30. The snapping of this leg into the groove of the outer ring 23 brings about the secure joint of such a character as to make it leak-proof or liquid-proof. The member or barrier 30 extends towards the other race ring 22 but does not contact therewith but enters into a groove or recess which is also circumferentially arranged as indicated by 29 in Figure 1. The leg or barrier 30 which projects towards this groove 29 does not contact, as stated, with the inner ring 22 but is in close proximity thereto for the purpose of acting to prevent a flow of lubricant between the end of the leg of the barrier 30 and the race ring 22. The barrier is preferably provided with a pocket portion which serves to hold the lubricant. As will be seen from an examination of the drawings shown in Fig. 1, the lubricant will be held between the balls and the barrier 30 and the centrifugal forces brought into play by the rotation of the balls will cause the lubricant to be thrown radially outwardly against the outer race 23 and thereby forced against the leg of the barrier which is secured to the ring 23.

Due to the tight joint that is provided the lubricant cannot pass out of the barrier and in consequence of the forces acting the lubricant is continually forced radially outwardly and largely maintained in the pocket of the barrier. The retention of such lubricant in the pocket serves as a reservoir to supply further quantities of lubricant to the bearing as required. At the same time, the barrier acts to prevent the entrance of any dirt or dust or grit or the like such as is usual in manufacturing plants, from injuring the bearings. It will have been seen that the barrier is secured by a liquid-tight joint to one of the races and extends in close proximity to the other race and has means for holding a lubricant, the barrier having an angular offset having one leg secured to one of the races and the other leg extending beyond the outside of the other race without contacting therewith.

Figure 2:
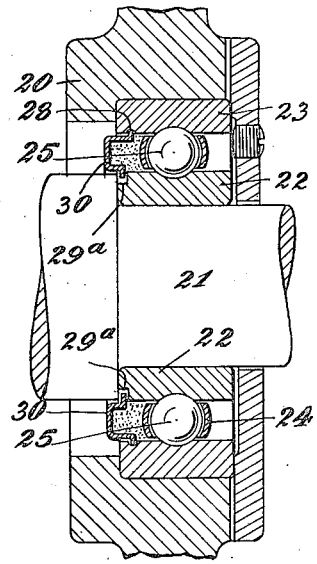
Figure 2 is a similar section of a different form of our invention.
Figure 4:
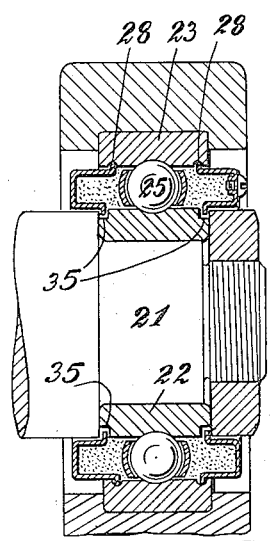
Figure 4 is a similar section also having the invention applied to both sides of the bearing.

In Figure 1 the free legs of the barrier 30 enter into the recess formed by the groove 29 but instead of providing such a groove in the inner race, in Figure 2 there is shown a cut-out 29ª and the free leg of the barrier 30 extends into the gap formed by this cut-out. Again, the lubricant, which is usually a suitable grease, is prevented from exuding between the free leg of the barrier 30 and the wall forming the gap or cut-out 29ª.

Figure 3:
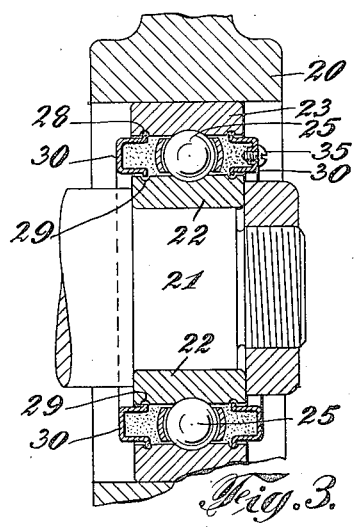
Figure 3 is a similar section showing the invention applied to both sides of the bearing.
Figure 5:
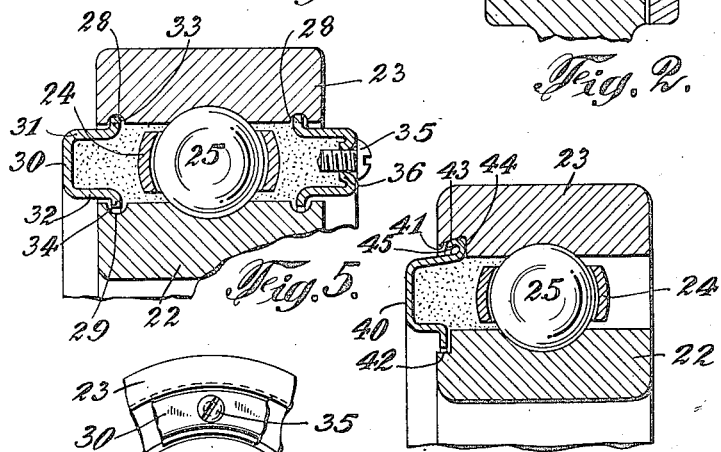
Figure 5 is an enlarged view of the structure shown in Figure 3.
Figure 7:
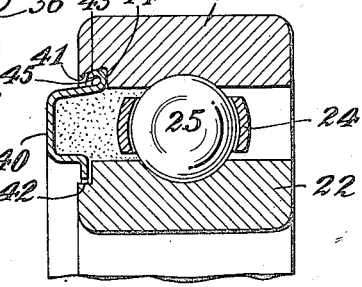
Figure 7 is a section of a different form of securing means.

In Figure 3 a structure similar to Figure 1 is shown but such barrier 30 is provided at both sides of the balls. The reason for this is that in Figure 1 the wall of the housing 20 prevents ingress of dirt or grit whereas the bearing shown in Figure 3 is not protected by a wall of the housing and so the barrier 30 is provided on both sides to hold the lubricant in position and at the same time prevent the entrance of dirt or grit to the bearing. One or both of the barriers is provided with openings which are screw-threaded and into which a screw 35 is adapted to be inserted so as to close up the opening and is adapted to be removed from the barrier so as to permit the space within the barrier to be filled with or supplied with lubricant. Preferably, that part of the barrier which is provided with the screw threaded portion is somewhat enlarged as shown in Figure 3 so as to provide a suitable bearing surface for the screw threads of the screw 35, or, the portion of the barrier may be bent over as indicated by 36 in Figure 5.

Instead of providing a groove as shown by 28 in Figures 1 to 5, the outer race 20 may be provided with a beveled walled cut-out 42 having the beveled walls 31 and 44 and the barrier may be provided with a bent over portion 45 which seats against the walls 41 and 44 and by the spring action of the barrier is held in position on the outer race. The inner race 22 is provided with a cut-out 42 which is not contacted by the barrier 40 but is in close proximity to the walls of the cut-out 42 so as to prevent the grease or lubricant from exuding between the barrier and the inner race.

Figure 8:
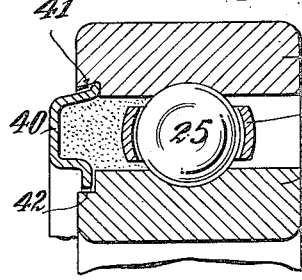
Figure 8 shows still a different form.

A similar beveled walled cut-out is shown in the outer race 23 of Figure 8, but instead of bending over the end of the barrier 40 it is simply provided with an angular end which seats in the cut-out 41. The other or inner side of the barrier 40 again is in proximity to the race 22 but not in contact therewith.

Figure 9:
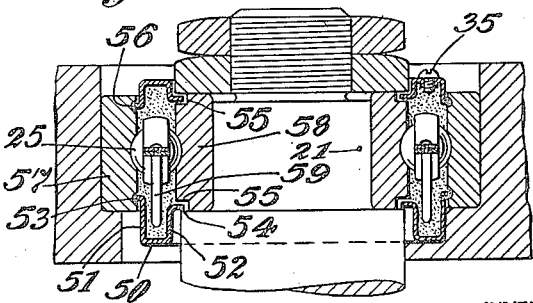
Figure 9 is a section showing the application of our invention to a vertical shaft bearing.

In order to adopt the lubricant barrier to bearings co-operating with a vertically arranged shaft the outer race 57 is provided with grooves 56 as shown in Fig. 9 and the other end of the barrier 50 extends into proximity with the inner race 58 but is not in contact therewith. In the embodiment shown in Figure 9, the lower barrier is provided with a rather deep pocket formed by the bottom wall 50, upright walls 51 and 52, which walls are bent into the angular members 53 and 54. The cage surrounding the balls 25 is provided with one or more projections indicated by 59 which serve to agitate the lubricant in the pocket 50. For the purposes of supplying the lubricant between the barriers and in contact with the bearings the screw 35 is again provided.

A lubricating barrier has been shown as secured to one ring and extending in proximity with the other ring but not in contact therewith and made of one part but such a barrier may be formed of two parts. Such an embodiment of the invention is shown in Figure 10 in which the barrier 60 has an angular member 61 with its free end bent in respect thereto, and indicated by 63, engaging the groove 64 of the outer ring 23. The other or inner portion of the barrier 60 extends near the shaft 21 but not in contact therewith. Interposed between the barrier 60 and the inner ring 22 is a secondary barrier 66 extending outwardly from the shaft 21, i. e., in the opposite direction to the extension 65 of the primary barrier 60. The secondary barrier 66 is not in contact with the primary barrier 60. By the insertion of lubricant between these two barriers 60 and 66, and the bearings 24—25, a suitable supply chamber is provided for holding the lubricant.

A somewhat modified form of this structure is shown in Figure 11 in which the secondary barrier 66 does not extend quite as far radially outwardly as the barrier 66 shown in Figure 10 and in this structure the barrier 66 acts rather as a protector preventing the lubricant from being thrown away from the bearings and the secondary barrier 66 performs a similar function. At the same time these barriers 60 and 66 act as dust protectors and prevent the entrance of dust or dirt into the bearings.

In Figure 12 we have shown a member 70 having an angular portion 71 with its outward end 73 engaging the groove 72 of the outer ring 73. The radial innermost end 65 of the barrier 70 is in proximity to the shaft 21 but not in contact therewith. This barrier 70 serves mainly as a dust protector and it will be noted that the inward end 65 of the barrier 70 extends out of the path of and inwardly beyond the race of the ring 22.

A similar structure is shown in Figure 13 in which the barrier 70 is arranged at one side of the bearing and the barrier 80 on the other side, said barrier having the angular portion 81 with its end extending into the groove 82 while the radial inward portion of the barrier 80 which is indicated by 83 is in close proximity to the shaft 21 but not in contact therewith and is beyond the inner race 22 and not in contact therewith and is radially inward of the race of the ring 22.

In Figure 14 a similar structure is shown which is adapted to a structure in which the shaft 21 terminates close to the bearing and for this purpose the barrier 86 which engages the groove 82 on the outer ring 23 is provided with a portion 85 which covers the entire end of the shaft 21 as also the inner ring and the balls and cages. A suitable screw 87 is provided which may be removed and a supply of lubricant inserted through the openings of the member 85 so as to supply the balls with lubricant.

In Figure 15 the barriers 90 are provided with pads 91 for preventing the ingress of dirt and for this purpose the barrier 90, which has its ends snapped into grooves 92 on the outer ring 23 is provided with parallel members 93 and 94 which extend close to the shaft 21 but do not contact therewith. Between the parallel members 93 and 94 the pad 91 is arranged and held so as to be in contact with the shaft 21. These pads 91 provide a close joint and so prevent very fine dust from entering the bearing.

In Figure 10 there was shown a barrier 60 with a curved angular member 61 and in Figure 12 the barrier 70 was provided with an angular portion 71 of more pronounced angularity than the curved form shown in Fig. 10. Instead of providing these angular members 61 and 71, these may be formed by the inclined portion 101 of the barrier 100 as shown in Figure 16. The end of the barrier 10 again seats in the groove 102 of the outer ring 23 and the radial inward portion of the barrier 100 is in proximity to the shaft 21 but not in contact therewith. This angular member can be used as a lubricating member or as a dust protecting member, it being noted that due to the inclination the barrier 100 extends beyond the inner race 22 and is not in contact therewith and extends to a point below the race of the ring 22.

In Figure 17 is shown an open type of bearings, sometimes called a cup and cone type, on which the barrier 30 seats in a groove 28, and extends towards a recess 29$^a$. Both sides of the bearing are provided with a barrier.

In Figure 18 is shown the barrier 30 applied in a similar manner to a roller bearing 25$^a$.

From the foregoing description it will be seen that there has been produced an improved grease packed bearing which is substantially leak-proof in the outer ring due to the barrier engaging in a tight manner grooves of the outer ring and the barriers serve to hold the material against centrifugal forces working negatively around the inner flange of the barrier plate. The end flange of the barrier plate projects into and beyond the maximum diameter of the inner ring but does not touch it and the clearances are such as to be a minimum.

We have shown the invention as applied to closed type bearings but it may also be applied to the open type of bearings or to the cup and cone type. The essential feature of the invention is the building into the bearing structures, the fundamentals of which serve to properly operate the lubricant and hold it in restrained manner and at the same time serve to eliminate foreign material and its possible effect against the proper and efficient operation of the bearings.

The device is simple in manufacture, in its installation and is not expensive and enables bearings to be manufactured at the ball bearing plants which are self-contained and include permanent lubricating means, the balls, cages and races being in contact with the lubricant from the completion of the manufacture of the bearings combined with the improved barriers until the same are actually used. This enables the bearings to be kept in good condition while they are waiting to be used and thus their trueness of finish maintained and rust and deterioration prevented.

A further advantage is that a grease packed bearing may be put into use by the eventual user without the usual necessity of providing in the design of the mounting for the protection of the bearing for its further maintained lubrication, and for its protection against operating dirt. The mountings are thereby considerably simplified.

While we have shown various embodiments of our invention, it is to be understood that we reserve the privilege of resorting to all such legitimate changes in the form, construction and relative arrangement of the several parts as may be fairly embodied within the spirit and scope of the invention as claimed.

We claim:

1. A ball or roller bearing having an inner race-ring and an outer race-ring provided with a groove at a side of the balls or rollers, and a closure member to provide a lubricant chamber for the space between the two race rings comprising an annular washer having a greater outside diameter than the inner diameter of the outer race-ring and having its outer edge positioned within said groove in the outer race-ring in contactual engagement so as to form a substantially leak-proof joint therewith, said washer having an inner diameter less than the outer diameter of the inner race-ring and having its side outwardly cupped or dished whereby its sides will extend over the outer side of the inner race-ring and have inner edges extending to a position in proximity to but not in contact with the inner race-ring.

2. A ball or roller bearing having an inner race-ring having an annular recess in its outer surface to a side of the balls or rollers and an outer race-ring provided with a groove at the corresponding side of the balls or rollers, and a closure member to provide a lubricant chamber for the space between the two race-rings comprising an annular washer having a greater outside diameter than the inner diameter of the outer race-ring and having its outer edge positioned within said groove in the outer race-ring in contactual engagement so as to form a substantially leak-proof joint therewith, said washer having an inner diameter less than the outer diameter of the inner race-ring and having its side outwardly cupped or dished whereby its sides will extend over the outer side of the inner race-ring and have inner edges extending into the annular recess in the inner race-ring to a position in proximity to but not in contact with the inner race-ring.

3. In combination with a ball or roller bearing having race-rings, the outer race-ring having annular grooves, one on each side of the balls or rollers, ball or roller bearing members between said race-rings, a holding cage for said bearing members, and barriers, one at each side of the balls or rollers having one end thereof sprung into the grooves of the inner surface of the outer race-ring and extending beyond and outside of the race of the inner race-ring without contacting therewith, and provided with a lateral cup-shaped portion for holding a supply of lubricant, and one or more projections on said holding cage extending into the lateral cup-shaped portion of one of the barriers for agitating the lubricant therein.

4. In combination with a ball or roller bearing having race-rings, the outer race-ring having annular grooves, one on each side of the balls or rollers, and barriers, one at each side of the balls or rollers having one end thereof sprung into the grooves of the inner surface of the outer race-ring and extending beyond and outside of the race of the inner race-ring without contacting therewith, and provided with a lateral cup-shaped portion for holding a supply of lubricant.

5. A ball bearing comprising inner and outer circular members, a ball cage between the members, the latter having complemental races for the balls, the outer member having an annular groove in adjacence to said balls, and a retainer expansibly fitted in the groove and in clearance relation with the face of the inner member to retain the oil within the bearing.

6. A ball bearing comprising inner and outer circular members, a ball cage between the members, said members having complemental races for the balls, the outer member having an annular groove in adjacence to said balls, and a retainer expansibly fitted in the groove and in clearance relation with the face of the inner member to retain oil in the bearing, the annular retainer being concentric with the hole in the inner member.

7. In an anti-friction bearing unit, a plurality of freely rotatable bearing elements, an outer race ring within which said bearing elements are enclosed, and means for retaining a lubricant at one side of the bearing elements consisting of an annular plate fixed at its outer edge to said race ring and having a part at its inner edge adapted to be positioned closely contiguous to but out of contact with a rotatable member engaged by said bearing elements and said part being offset out of the plane of the outer edge of said retaining plate.

8. A grease packed bearing unit comprising inner and outer circular members, bearing elements between said members, and means carried by one of said members constituting a component part of the bearing unit and positioned relative to the other member to confine a body of grease having a volume in excess of the space between the opposed faces of said members at one side of the bearing and in contact with said bearing elements.

9. An anti-friction bearing comprising inner and outer circular members, bearing elements between said members engaged with the opposed faces thereof, an annular retainer plate, said outer member having an annular groove in its inner face and the outer edge of said plate being fixedly held in said groove, and the inner edge of said plate being positioned closely adjacent to and in clearance relation with the face of the inner member to retain a body of lubricant within the bearing.

In testimony that we claim the foregoing as our invention, we have signed our names hereunder.

GEORGE R. BOTT.
FREDERICK E. MUELLER.